(12) United States Patent
Anderson et al.

(10) Patent No.: US 9,670,086 B2
(45) Date of Patent: Jun. 6, 2017

(54) GLASS MANUFACTURING APPARATUS AND METHODS

(71) Applicant: Corning Incorporated, Corning, NY (US)

(72) Inventors: James Gary Anderson, Dundee, NY (US); Steven Roy Burdette, Big Flats, NY (US); Liam Ruan de Paor, Hampstead, NC (US); Lewis Kirk Klingensmith, Corning, NY (US); Gautam Narendra Kudva, Horseheads, NY (US); Gary Graham Squier, Elmira, NY (US); David John Ulrich, Burdett, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 15/064,885

(22) Filed: Mar. 9, 2016

(65) Prior Publication Data
US 2016/0185644 A1 Jun. 30, 2016

Related U.S. Application Data

(62) Division of application No. 13/305,810, filed on Nov. 29, 2011, now Pat. No. 9,315,409.

(51) Int. Cl.
*C03B 17/06* (2006.01)
(52) U.S. Cl.
CPC .................................. *C03B 17/068* (2013.01)

(58) Field of Classification Search
CPC ....... C03B 17/068; C03B 17/064; C03B 13/16; C03B 17/061
See application file for complete search history.

(56) References Cited

U.S. PATENT DOCUMENTS

| | | | |
|---|---|---|---|
| 1,586,618 A | 6/1926 | Ferngren | |
| 3,419,374 A | 12/1968 | Offenbacher et al. | |
| 3,773,486 A | 11/1973 | Toussaint et al. | |
| 4,612,030 A | 9/1986 | Smids | |

(Continued)

FOREIGN PATENT DOCUMENTS

| | | | |
|---|---|---|---|
| JP | 1998291826 A | 11/1998 | |
| JP | 200751028 A | 3/2007 | |

(Continued)

OTHER PUBLICATIONS

English Translation of CN201210599049.4 Notice of First Office Action Dated Dec. 3, 2014; 13 Pages; Chinese Patent Office.

(Continued)

*Primary Examiner* — Jodi C Franklin
(74) *Attorney, Agent, or Firm* — Matthew J. Mason

(57) ABSTRACT

A glass manufacturing apparatus comprises a forming device configured to produce a glass ribbon and a control device configured to independently operate a first pull roll apparatus and a second pull roll apparatus such that at least one of a first upstream pair of draw rolls rotates with a substantially constant torque and at least one of a first downstream pair of draw rolls rotates with a substantially constant angular velocity. In further examples, methods of manufacturing a glass ribbon are provided.

13 Claims, 10 Drawing Sheets

(56) References Cited

U.S. PATENT DOCUMENTS

| | | | | |
|---|---|---|---|---|
| 6,502,423 B1* | 1/2003 | Ostendarp | C03B 17/06 | 65/100 |
| 6,616,025 B1 | 9/2003 | Andrewlavage, Jr. | | |
| 6,758,064 B1* | 7/2004 | Kariya | C03B 17/06 | 65/118 |
| 7,430,880 B2 | 10/2008 | Butts et al. | | |
| 7,984,625 B2* | 7/2011 | Markham | C03B 17/064 | 65/29.12 |
| 8,037,716 B2* | 10/2011 | Aniolek | C03B 17/067 | 65/90 |
| 8,047,085 B2* | 11/2011 | Cady | C03B 17/068 | 73/862.49 |
| 8,146,388 B2* | 4/2012 | Anderson | C03B 17/067 | 65/199 |
| 9,139,462 B2* | 9/2015 | Kudva | C03B 17/068 | |
| 9,212,079 B2 | 12/2015 | Kirby et al. | | |
| 2006/0042314 A1* | 3/2006 | Abbott, III | C03B 17/06 | 65/25.3 |
| 2008/0041107 A1* | 2/2008 | Hsu | C03B 13/04 | 65/33.9 |
| 2009/0107182 A1* | 4/2009 | Anderson | C03B 13/16 | 65/90 |
| 2011/0100056 A1* | 5/2011 | Anderson | C03B 17/067 | 65/90 |
| 2011/0209502 A1* | 9/2011 | El Kahlout | C03B 17/064 | 65/90 |
| 2011/0314870 A1* | 12/2011 | Fredholm | C03B 17/062 | 65/94 |
| 2013/0008208 A1* | 1/2013 | Kariya | C03B 17/067 | 65/53 |
| 2013/0133371 A1* | 5/2013 | Burdette | C03B 17/068 | 65/91 |
| 2013/0219964 A1* | 8/2013 | Kudva | C03B 17/068 | 65/29.1 |
| 2013/0319050 A1* | 12/2013 | Agrawal | C03B 17/068 | 65/91 |
| 2014/0174132 A1* | 6/2014 | Aburada | C03B 17/068 | 65/185 |
| 2015/0096330 A1* | 4/2015 | Aburada | C03B 17/068 | 65/91 |

FOREIGN PATENT DOCUMENTS

| | | |
|---|---|---|
| JP | 2010235355 A | 10/2010 |
| JP | 2011219361 A | 11/2011 |
| WO | 2006121709 A1 | 11/2006 |
| WO | 2011007656 A1 | 1/2011 |

OTHER PUBLICATIONS

English Translation of JP2012260809 Office Action Dated Oct. 25, 2016; 5 Pages; Japanese Patent Office.

* cited by examiner

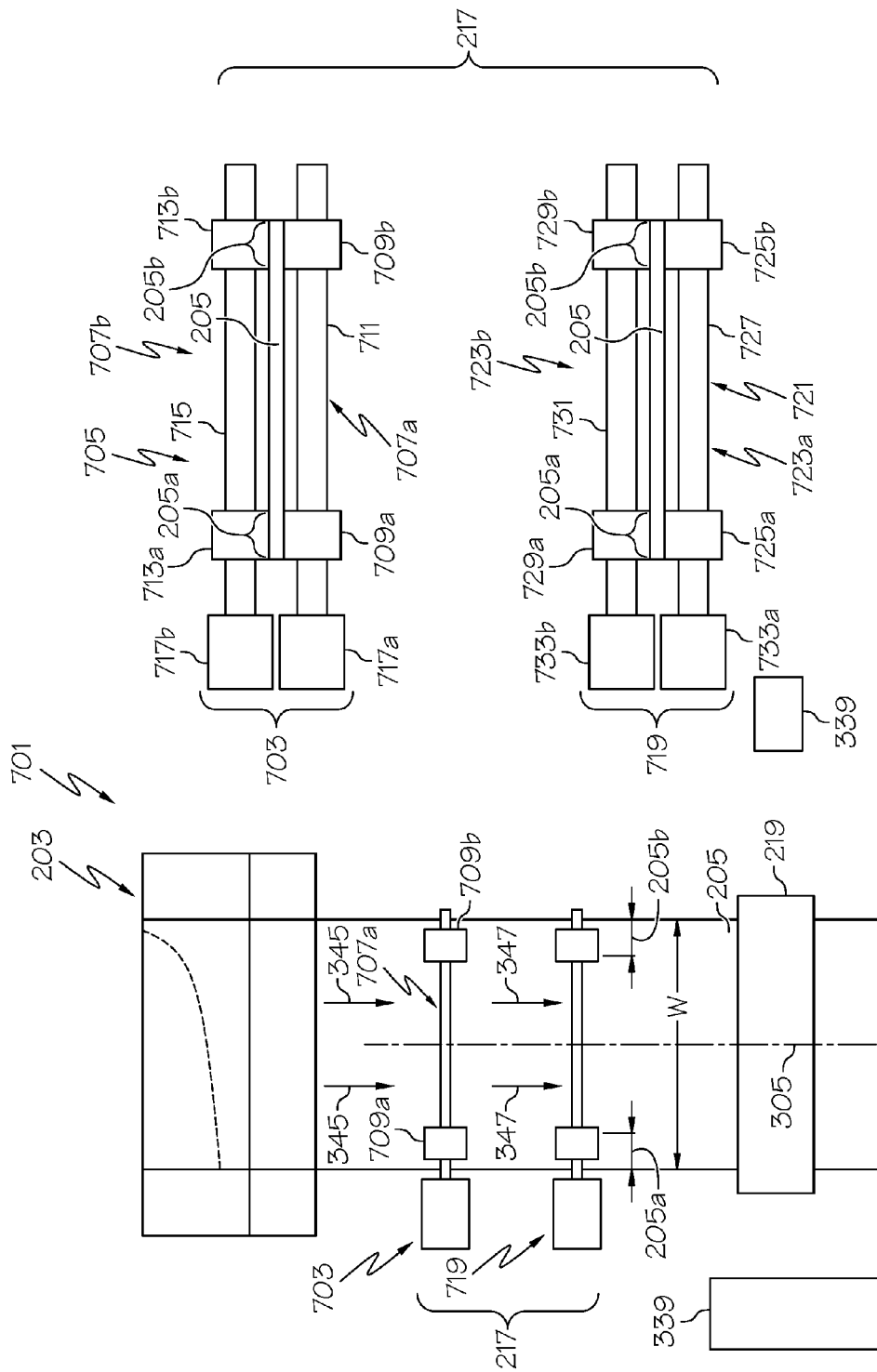

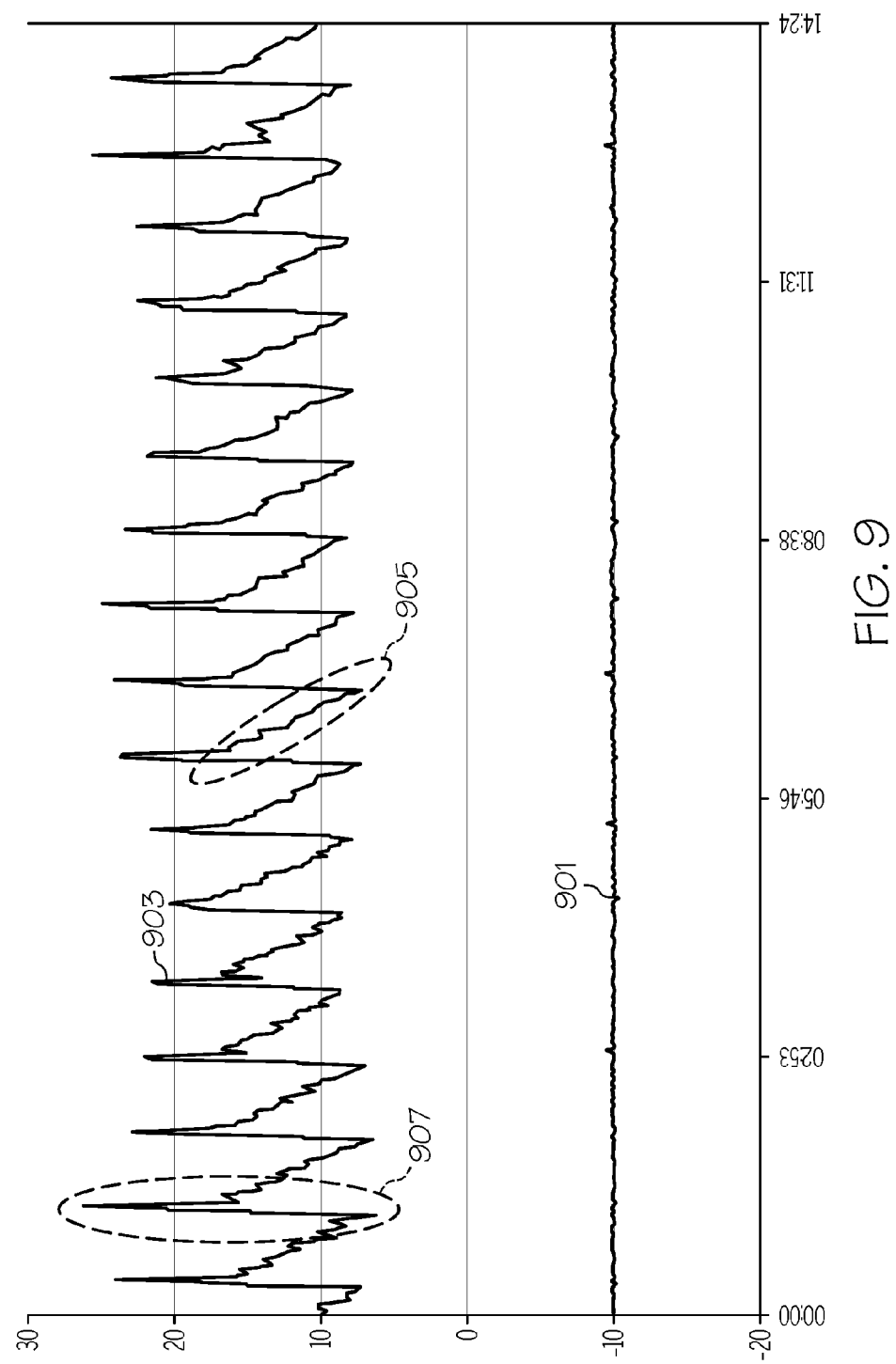

GLASS MANUFACTURING APPARATUS AND METHODS

CROSS-REFERENCE TO RELATED APPLICATIONS

This application is a divisional of and claims the benefit of priority to U.S. patent application Ser. No. 13/305,810, filed on Nov. 29, 2011, the content of which is relied upon and incorporated herein by reference in its entirety.

TECHNICAL FIELD

The present disclosure relates generally to glass manufacturing apparatus and methods and, more particularly, to glass manufacturing apparatus and methods with at least a first pull roll apparatus and a second pull roll apparatus.

BACKGROUND

Glass manufacturing apparatus are known to produce glass sheets, for example, by a fusion down draw process. U.S. Patent Application Publication No. 2009/0107182 that published on Apr. 30, 2009 to Anderson et al. discloses an example glass manufacturing apparatus with a lower pull roll apparatus having a master motor to rotate a lower pair of rolls at a constant angular velocity. The glass manufacturing apparatus further includes an upper pull roll apparatus with upper slave motors configured to rotate an upper pair of rolls at torques that match a predetermined percentage of the measured torque of the master motor of the lower pair of rolls.

The master/slave configuration of the lower/upper pull roll apparatus of the Anderson et al. publication can be beneficial under various process applications. However, perturbations from the glass ribbon growth and sheet formation may propagate to the upper pair of rolls. For example, FIG. 1 illustrates an example graph of a master/slave configuration where the Y-axis is force (pounds) and the X-axis is time (minutes:seconds). One plot 101 represents the force being applied to the glass ribbon by the lower rolls while the other plot 103 represents the force being applied to the glass ribbon by the upper rolls. As shown, each plot 101, 103 includes a saw-tooth force pattern with a first force pattern 105 representing glass ribbon growth and a second force pattern 107 representing separating of a glass sheet from the glass ribbon.

SUMMARY

The following presents a simplified summary of the disclosure in order to provide a basic understanding of some example aspects described in the detailed description.

In one example aspect of the disclosure, a glass manufacturing apparatus comprises a forming device configured to produce a glass ribbon including a width extending between a first edge portion and a second edge portion. The glass manufacturing apparatus further includes a first pull roll apparatus including a first upstream pair of draw rolls configured to draw the first edge portion of the glass ribbon from the forming device along a draw path extending transverse to the width of the glass ribbon. The glass manufacturing apparatus further includes a second pull roll apparatus including a first downstream pair of draw rolls positioned downstream along the draw path from the first upstream pair of draw rolls. The first downstream pair of draw rolls are configured to further draw the first edge portion of the glass ribbon along the draw path. The glass manufacturing apparatus still further includes a control device configured to independently operate the first pull roll apparatus and the second pull roll apparatus such that at least one of the first upstream pair of draw rolls rotates with a substantially constant torque and at least one of the first downstream pair of draw rolls rotates with a substantially constant angular velocity.

In one embodiment of the aspect, the control device is configured to operate the first pull roll apparatus such that both of the first upstream pair of draw rolls rotate with a substantially constant torque.

In another embodiment of the aspect, the control device is configured to operate the second pull roll apparatus such that both of the first downstream pair of draw rolls rotate with a substantially constant angular velocity.

In still another embodiment of the aspect, the first pull roll apparatus includes a second upstream pair of draw rolls configured to draw the second edge portion of the glass ribbon from the forming device along the draw path. The control device is further configured to operate the first pull roll apparatus such that at least one of the second upstream pair of draw rolls rotates with a substantially constant torque.

In yet another embodiment of the aspect, the control device is configured to operate the first pull roll apparatus such that both of the second upstream pair of draw rolls rotate with a substantially constant torque.

In another embodiment of the aspect, the second pull roll apparatus includes a second downstream pair of draw rolls positioned downstream along the draw path from the second upstream pair of draw rolls. The second downstream pair of draw rolls are configured to further draw the second edge portion of the glass ribbon along the draw path. The control device is further configured to operate the second pull roll apparatus such that at least one of the second downstream pair of draw rolls rotates with a substantially constant angular velocity.

In still another embodiment of the aspect, the control device is configured to operate the second pull roll apparatus such that both of the second downstream pair of draw rolls rotate with a substantially constant angular velocity.

In another example aspect of the disclosure, a method of manufacturing a glass ribbon comprises the step (I) of providing a first pull roll apparatus including a first upstream pair of draw rolls and a second pull roll apparatus including a first downstream pair of draw rolls positioned downstream along a draw path from the first upstream pair of draw rolls. The method further includes the step (II) of forming a glass ribbon with a width extending between a first edge portion and a second edge portion. The method also includes the step (III) of independently operating the first pull roll apparatus such that at least one of the first upstream pair of draw rolls rotates with a substantially constant torque to draw the first edge portion of the glass ribbon along the draw path. The method also includes the step (IV) of independently operating the second pull roll apparatus such that at least one of the first downstream pair of draw rolls rotates with a substantially constant angular velocity to further draw the first edge portion of the glass ribbon along the draw path.

In one embodiment of the aspect, step (III) includes operating the first pull roll apparatus such that both of the first upstream pair of draw rolls rotate with a substantially constant torque.

In another embodiment of the aspect, step (III) includes operating the second pull roll apparatus such that both of the first downstream pair of draw rolls rotate with a substantially constant angular velocity.

In still another embodiment of the aspect, step (I) further provides the first pull roll apparatus with a second upstream pair of draw rolls and step (III) operates the first pull roll apparatus such that at least one of the second upstream pair of draw rolls rotates with a substantially constant torque to draw the second edge portion of the glass ribbon along the draw path.

In yet another embodiment of the aspect, step (III) further operates the first pull roll apparatus such that both of the second upstream pair of draw rolls rotate with a substantially constant torque.

In still another embodiment of the aspect, step (I) further provides the second pull roll apparatus with a second downstream pair of draw rolls positioned downstream along the draw path from the second upstream pair of draw rolls and step (III) further operates the second pull roll apparatus such that at least one of the second downstream pair of draw rolls rotates with a substantially constant angular velocity to further draw the second edge portion of the glass ribbon along the draw path.

In another embodiment of the aspect, step (III) further operates the second pull roll apparatus such that both of the second downstream pair of draw rolls rotate with a substantially constant angular velocity.

In still another embodiment of the aspect, the method further includes a step (V) of sequentially separating a plurality of glass sheets from the glass ribbon over a period of time at a location downstream along the draw path from the first downstream pair of draw rolls. Throughout the period of time, the first upstream pair of draw rolls apply a substantially constant force to the first edge portion of the glass ribbon along the draw path and the first downstream pair of draw rolls apply a varying force to the first edge portion of the glass ribbon along the draw path.

In yet another embodiment of the aspect, the glass ribbon is drawn in a draw direction along the draw path. Throughout the period of time, first upstream pair of draw rolls apply a substantially constant force to the first edge portion of the glass ribbon in a direction opposite the draw direction, and the first downstream pair of draw rolls apply a varying force to the first edge portion of the glass ribbon in a direction of the draw direction, wherein the first edge portion is constantly maintained in tension between the first upstream pair of draw rolls and the first downstream pair of draw rolls throughout the period of time.

In still another aspect of the disclosure, a method of manufacturing a glass ribbon comprises the step (I) of providing a first pull roll apparatus including a first upstream pair of draw rolls and a second pull roll apparatus including a first downstream pair of draw rolls positioned downstream along a draw path from the first upstream pair of draw rolls. The method further includes the step (II) of forming a glass ribbon with a width extending transverse to the draw path between a first edge portion and a second edge portion. The method still further includes the step (III) of independently operating the first pull roll apparatus over a period of time such that the first upstream pair of draw rolls apply a substantially constant force to the first edge portion of the glass ribbon along the draw path. The method further includes the step (IV) of independently operating the second pull roll apparatus over the period of time such that at least one of the first downstream pair of draw rolls rotates with a substantially constant angular velocity and the first downstream pair of draw rolls apply a varying force to the first edge portion of the glass ribbon along the draw path. The method further includes the step (V) of sequentially separating a plurality of glass sheets from the glass ribbon over the period of time at a location downstream along the draw path from the first downstream pair of draw rolls.

In one embodiment of the aspect, the glass ribbon is drawn in a draw direction along the draw path. Throughout the period of time, first upstream pair of draw rolls apply the substantially constant force to the first edge portion of the glass ribbon in a direction opposite the draw direction, and the first downstream pair of draw rolls apply the varying force to the first edge portion of the glass ribbon in a direction of the draw direction. The first edge portion is maintained in tension between the first upstream pair of draw rolls and the first downstream pair of draw rolls throughout the period of time.

In another embodiment of the aspect, step (I) further provides the first pull roll apparatus with a second upstream pair of draw roll. Step (III) operates the first pull roll apparatus such that the second upstream pair of draw rolls apply a substantially constant force to the second edge portion of the glass ribbon along the draw path.

In yet another embodiment of the aspect, step (I) further provides the second pull roll apparatus with a second downstream pair of draw rolls positioned downstream along the draw path from the second upstream pair of draw rolls. Step (III) further operates the second pull roll apparatus such that at least one of the second downstream pair of draw rolls rotates with a substantially constant angular velocity and the second downstream pair of draw rolls apply a varying force to the second edge portion of the glass ribbon along the draw path.

BRIEF DESCRIPTION OF THE DRAWINGS

These and other aspects are better understood when the following detailed description is read with reference to the accompanying drawings, in which:

FIG. 7 is a front view of another pull roll device in accordance with aspects of the disclosure;

FIG. 8 are top views of the first pull roll apparatus and the second pull roll apparatus of FIG. 7;

FIG. 9 shows an example graph of the forces applied to the glass ribbon by a first upstream pair of draw rolls and the first downstream pair of draw rolls;

DETAILED DESCRIPTION

Figure 1:
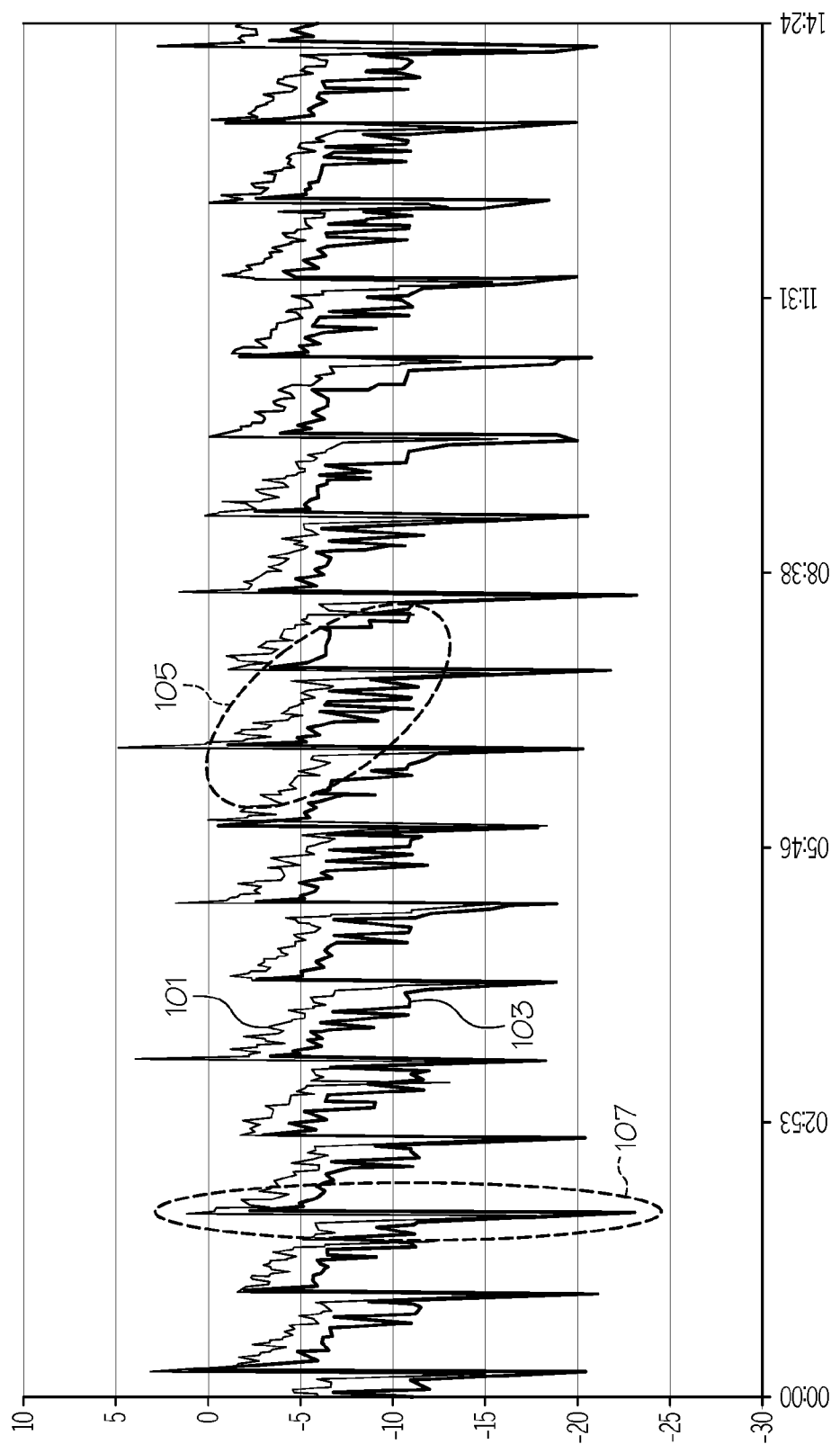
FIG. 1 illustrates an example graph of a master/slave configuration.

Examples will now be described more fully hereinafter with reference to the accompanying drawings in which example embodiments are shown. Whenever possible, the same reference numerals are used throughout the drawings to refer to the same or like parts. However, aspects may be embodied in many different forms and should not be construed as limited to the embodiments set forth herein.

Figure 2:
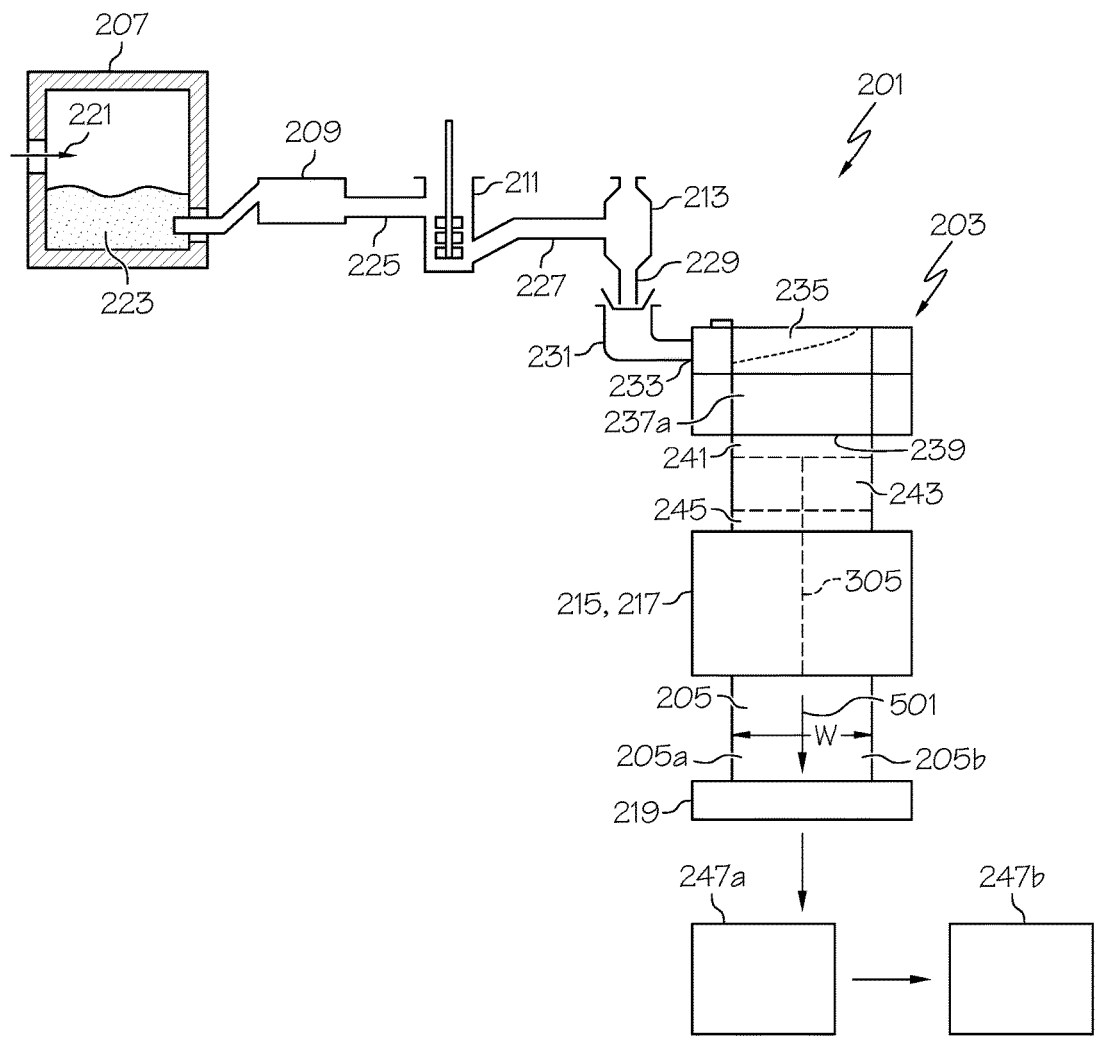
FIG. 2 is a glass manufacturing apparatus in accordance with examples of the disclosure.

Referring now to FIG. 2, there is shown a schematic view of an exemplary glass manufacturing apparatus 201 may be used in accordance with aspects of the disclosure. The exemplary glass manufacturing apparatus 201 is illustrated as a down draw fusion apparatus although other forming apparatus may be used in further examples. In one example, the glass manufacturing apparatus 201 can include a forming device 203 to produce a glass ribbon 205 including a width "W" extending between a first edge portion 205a and a second edge portion 205b of the glass ribbon 205.

As further illustrated in FIG. 2, the glass manufacturing apparatus 201 can include a melting vessel 207, a fining vessel 209, a mixing vessel 211, a delivery vessel 213, the forming device 203, a pull roll device 215, 217 and a separating device 219.

The melting vessel 207 is where the glass batch materials are introduced as shown by arrow 221 and melted to form molten glass 223. The fining vessel 209 has a high temperature processing area that receives the molten glass 223 (not shown at this point) from the melting vessel 207 and in which bubbles are removed from the molten glass 223. The fining vessel 209 is connected to the mixing vessel 211 by a finer to stir chamber connecting tube 225. The mixing vessel 211 is connected to the delivery vessel 213 by a stir chamber to bowl connecting tube 227. The delivery vessel 213 delivers the molten glass 223 through a downcomer 229 to an inlet 231 and into the forming device 203.

Figure 3:
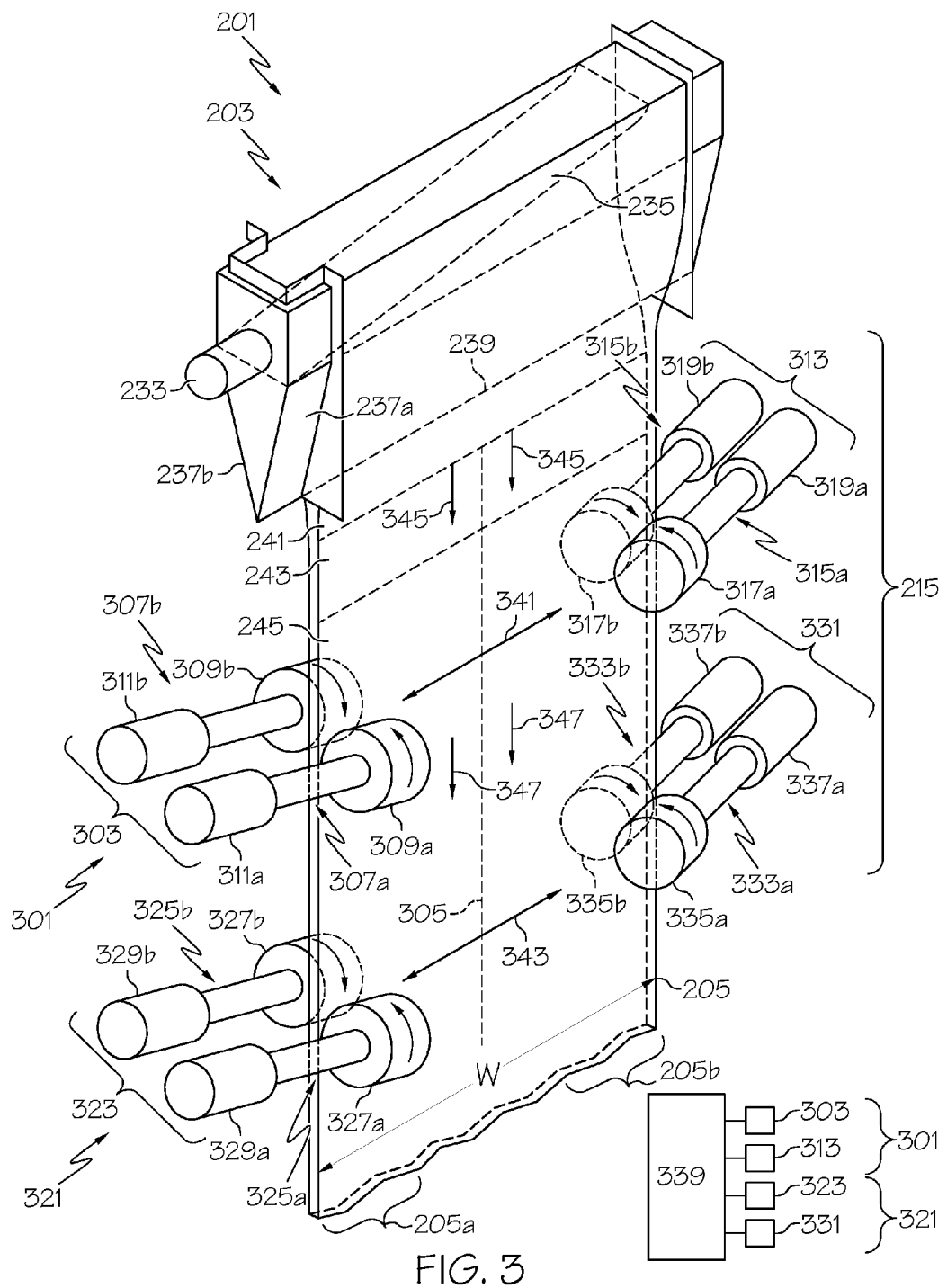
FIG. 3 is a perspective view of portions of the glass manufacturing apparatus of FIG. 2 with a first example pull roll device in accordance with aspects of the disclosure.

Various forming devices may be used in accordance with aspects of the disclosure. For example, as shown in FIGS. 2 and 3, the forming device 203 includes an opening 233 that receives the molten glass 223 which flows into a trough 235. As best shown in FIG. 3 the molten glass 223 from the trough 235 then overflows and runs down two sides 237a and 237b before fusing together at a root 239 of the forming device 203. The root 239 is where the two sides 237a, 237b come together and where the two overflow walls of molten glass 223 flowing over each of the two sides 237a, 237b fuse together as the glass ribbon 205 drawn downward off the root 239.

A portion of the glass ribbon 205 is drawn off the root 239 into a viscous zone 241 wherein the glass ribbon 205 begins thinning to a final thickness. The portion of the glass ribbon 205 is then drawn from the viscous zone 241 into a setting zone 243. In the setting zone 243, the portion of the glass ribbon 205 is set from a viscous state to an elastic state with the desired profile. The portion of the glass ribbon 205 is then drawn from the setting zone 243 to an elastic zone 245. Once in the elastic zone 245, the glass ribbon 205 may be deformed, within limits, without permanently changing the profile of the glass ribbon 205.

Turning back to FIG. 2, after the portion of the glass ribbon 205 enters the elastic zone 245, a separating device 219 may be provided to sequentially separate a plurality of glass sheets 247a, 247b from the glass ribbon 205 over a period of time. The separating device 219 may comprise the illustrated traveling anvil machine although further separating devices may be provided in further examples.

The glass manufacturing apparatus 201 further includes a pull roll device 215, 217 schematically illustrated in FIG. 2. As discussed more fully below, the pull roll device 215, 217 may be provided to help draw the glass ribbon 205 from the root 239 and may isolate transmission of forces up the glass ribbon 205 from the elastic zone 245 to the setting zone 243. As such, the pull roll devices of the present disclosure can draw the glass ribbon to the desired thickness while also reducing residual stress within the glass sheet. As shown, the pull roll device 215, 217 can be located entirely within the elastic zone 245. Indeed, as illustrated in the drawings, the first and second pull roll apparatus (discussed more fully below) are both located within the elastic zone 245. In further examples, a portion of the pull roll device 215, 217 may be located in the setting zone 243. For example, the first pull roll apparatus may be located in the setting zone 243 while the second pull roll apparatus is located in the elastic zone 245. In still further examples, the pull roll device 215, 217 may be located entirely within the setting zone 243. For example, the first and second pull roll apparatus can both be located within the setting zone 243.

FIG. 3, illustrate a first example of the pull roll device 215 in accordance with one example of the disclosure although other pull roll device 215 constructions may be provided in further examples. As shown in FIG. 3, the pull roll device 215 can include a first pull roll apparatus 301 including a first upstream pair of draw rolls 303 configured to draw the first edge portion 205a of the glass ribbon 205 from the forming device 203 along a draw path 305 extending transverse to the width "W" of the glass ribbon 205.

As shown, the first upstream pair of draw rolls 303 can include a first pull roll member 307a and a second pull roll member 307b. The first and second pull roll members 307a, 307b can each be provided with a respective refractory roll covering 309a, 309b configured to engage the first edge portion 205a of the glass ribbon 205 therebetween. At least one of the first and second pull roll members 307a, 307b may be provided with a respective motor 311a, 311b. For example, as shown, both the first and second pull roll members 307a, 307b are provided with a respective motor 311a, 311b. In further examples, only one of the first and second pull roll members 307a, 307b is provided with a motor wherein the other pull roll member may be provided with a bearing such that only one of the first and second pull roll members 307a, 307b is driven.

In another example, in addition or in alternative to the first upstream pair of draw rolls 303, the first pull roll apparatus 301 can include a second upstream pair of draw rolls 313 configured to draw the second edge portion 205b of the glass ribbon 205 from the forming device 203 along the draw path 305. As shown, the second upstream pair of draw rolls 313 can include a first pull roll member 315a and a second pull roll member 315b. The first and second pull roll members 315a, 315b can each be provided with a respective refractory roll covering 317a, 317b configured to engage the second edge portion 205b of the glass ribbon 205 therebetween. At least one of the first and second pull roll members 315a, 315b may be provided with a respective motor 319a, 319b. For example, as shown, both the first and second pull roll members 315a, 315b are provided with a respective motor 319a, 319b. In further examples, only one of the first and second pull roll members 315a, 315b is provided with a motor wherein the other pull roll member may be provided with a bearing such that only one of the first and second pull roll members 315a, 315b is driven.

The pull roll device 215 further includes a second pull roll apparatus 321 including a first downstream pair of draw rolls 323 positioned downstream along the draw path 305 from the first upstream pair of draw rolls 303, wherein the first downstream pair of draw rolls 323 are configured to further draw the first edge portion 205a of the glass ribbon 205 along the draw path 305. As shown, the first downstream pair of draw rolls 323 can include a first pull roll member 325a and a second pull roll member 325b. The first and second pull roll members 325a, 325b can each be provided with a respective refractory roll covering 327a, 327b configured to engage the first edge portion 205a of the glass ribbon 205 therebetween. At least one of the first and second pull roll members 325a, 325b may be provided with a respective motor 329a, 329b. For example, as shown, both the first and second pull roll members 325a, 325b are provided with a respective motor 329a, 329b. In further examples, only one of the first and second pull roll members 325a, 325b is provided with a motor wherein the other pull roll member may be provided with a bearing such that only one of the first and second pull roll members 325a, 325b is driven.

In another example, in addition or in alternative to the first downstream pair of draw rolls 323, the second pull roll apparatus 321 can include a second downstream pair of draw rolls 331 positioned downstream along the draw path 305 from the second upstream pair of draw rolls 313, wherein the second downstream pair of draw rolls 331 are configured to further draw the second edge portion 205b of the glass ribbon 205 along the draw path 305. As shown, the second downstream pair of draw rolls 331 can include a first pull roll member 333a and a second pull roll member 333b. The first and second pull roll members 333a, 333b can each be provided with a respective refractory roll covering 335a, 335b configured to engage the second edge portion 205b of the glass ribbon 205 therebetween. At least one of the first and second pull roll members 333a, 333b may be provided with a respective motor 337a, 337b. For example, as shown, both the first and second pull roll members 333a, 333b are provided with a respective motor 337a, 337b. In further examples, only one of the first and second pull roll members 333a, 333b is provided with a motor wherein the other pull roll member may be provided with a bearing such that only one of the first and second pull roll members 333a, 333b is driven.

The pull roll device 215 of the glass manufacturing apparatus 201 can further include a control device 339 (e.g., programmable logic controller) configured to independently operate the first pull roll apparatus 301 and the second pull roll apparatus 321 such that at least one of the first upstream pair of draw rolls 303 rotates with a substantially constant torque and at least one of the first downstream pair of draw rolls 323 rotates with a substantially constant angular velocity. Independent operation of the first and second pull roll apparatus, for purposes of this disclosure, means that one of the first and second pull roll apparatus may be operated without being affected by operation of the other of the first and second pull roll apparatus. As such, for example, independently operating the first pull roll apparatus 301 with the control device provides for the control device to operate the first pull roll apparatus 301 without considering changes in operating parameters of the second pull roll apparatus 321.

As mentioned previously, the first upstream pair of draw rolls 303 can include a single motor associated with one of the first or second pull roll members 307a, 307b. In such an example, the control device 339 can operate the single motor such that the associated first or second pull roll members 307a, 307b is rotated with a substantially constant torque. As further described above, each of the first and second pull roll members 307a, 307b may be provided with a corresponding motor 311a, 311b. In such examples, the control device 339 may operate the motors 311a, 311b such that at least one, such as both, of the first upstream pair of draw rolls 303 rotate with a substantially constant torque. Rotating both pull roll members 307a, 307b of the first upstream pair of draw rolls 303 with a substantially constant torque may be desirable to apply force equally at both sides of the first edge portion 205a of the glass ribbon 205.

As mentioned previously, first pull roll apparatus 301 may also include an optional second upstream pair of draw rolls 313. In such examples, the second upstream pair of draw rolls 313 can include a single motor associated with one of the first or second pull roll members 315a, 315b. In such an example, the control device 339 can operate the single motor such that the associated first or second pull roll members 315a, 315b is rotated with a substantially constant torque. As further described above, each of the first and second pull roll members 315a, 315b may be provided with a corresponding motor 319a, 319b. In such examples, the control device 339 may operate the motors 319a, 319b such that at least one, such as both, of the second upstream pair of draw rolls 313 rotate with a substantially constant torque. Rotating both pull roll members 315a, 315b of the second upstream pair of draw rolls 313 with a substantially constant torque may be desirable to apply force equally at both sides of the second edge portion 205b of the glass ribbon 205.

Although not required, in some examples, the control device 339 can operate one or both of the motors associated with the first upstream pair of draw rolls 303 with a substantially constant first torque and can simultaneously operate one or both of the motors associated with the second upstream pair of draw rolls 313 to rotate with a substantially constant second torque that is substantially equal to the first torque. Providing substantially equal first and second torques can be desired, for example, to apply substantially the same force to the glass ribbon 205 and the first and second edge portions 205a, 205b.

As mentioned previously, first downstream pair of draw rolls 323 can include a single motor associated with one of the first or second pull roll members 325a, 325b. In such an example, the control device 339 can operate the single motor such that the associated first or second pull roll members 325a, 325b rotates with a substantially constant angular velocity. As further described above, each of the first and second pull roll members 325a, 325b may be provided with a corresponding motor 329a, 329b. In such examples, the control device 339 may operate the motors 329a, 329b such that at least one, such as both, of the first downstream pair of draw rolls 323 rotate with a substantially constant angular velocity. Rotating both pull roll members 327a, 327b of the first downstream pair of draw rolls 323 with a substantially constant angular velocity may be desirable to draw the glass ribbon equally at both sides of the first edge portion 205a of the glass ribbon 205.

As mentioned previously, first pull roll apparatus 301 may also include an optional second downstream pair of draw rolls 331. In such examples, the second downstream pair of draw rolls 331 can include a single motor associated with one of the first or second pull roll members 333a, 333b. In such an example, the control device 339 can operate the single motor such that the associated first or second pull roll members 333a, 333b is rotated with a substantially constant angular velocity. As further described above, each of the first and second pull roll members 333a, 333b may be provided with a corresponding motor 337a, 337b. In such examples, the control device 339 may operate at least one, such as both, of the second downstream pair of draw rolls 331 to rotate with a substantially constant angular velocity. Rotating both pull roll members 333a, 333b of the second downstream pair of draw rolls 331 with a substantially constant angular velocity may be desirable to draw the glass ribbon equally at both sides of the second edge portion 205b of the glass ribbon 205.

Although not required, in some examples, the control device 339 can operate one or both of the motors associated with the first downstream pair of draw rolls 323 with a substantially constant first angular velocity and can simultaneously operate one or both of the motors associated with the second downstream pair of draw rolls 331 to rotate with a substantially constant second angular velocity that is substantially equal to the first angular velocity. Providing substantially equal first and second angular velocities can be desired, for example, to apply draw the glass ribbon equally at the first and second edge portions 205a, 205b.

Figure 4:
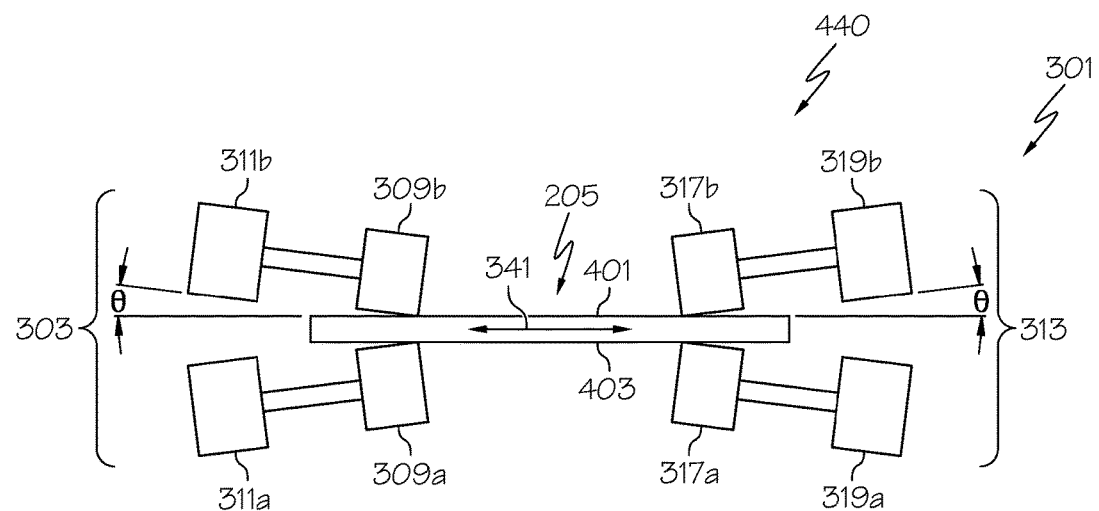
FIG. 4 is an example top view of the first pull roll apparatus of FIG. 3.

In some examples, the pairs of draw rolls discussed throughout the application may have similar constructions and orientations as set forth in U.S. Patent Application Publication No. 2009/0107182 that published on Apr. 30, 2009 to Anderson et al., which is herein incorporated by reference in its entirety. For example, any of the pairs of draw rolls may be vertically downtilted or horizontally level rolls with respect to the glass ribbon. Moreover, As shown in FIG. 4, any of the pairs of rolls (horizontally level or downtilted) may be positioned to have a predetermined horizontal angle θ that a respective face of the rolls would be positioned relative to a respective major surface 401, 403 of the glass ribbon 205. The horizontal angle θ can be desirable to provide an appropriate level of cross-draw tension 341 and/or accommodate a taper effect that may occur during normal roll wear.

FIG. 3 illustrates an example where each of the first and second upstream pair of draw rolls 303, 313 and first and second downstream pair of draw rolls 323, 331 can comprise vertically downtilted rolls with respect to the glass ribbon 205. The downtilt angle of any pair of the draw rolls may be different or the same as any other pair of draw rolls depending on process considerations. Downtilting of the first and/or second upstream pair of draw rolls 303, 313 can provide a desired level of cross-draw tension 341 between the two pairs of draw rolls 303, 313. Likewise, downtilting the first and/or second downstream pair of draw rolls 323, 331 can provide a desired level of cross-draw tension 343 between the two pairs of draw rolls 323, 331.

In some examples, the control device 339 may be configured to activate an automatic positioner (not shown) or a manual mechanism may be used to adjust the downtilt position of the vertically towntilted rolls so as to control (or tune) the average cross-draw tension 341, 343 across the glass ribbon 205.

In further examples, one or more of the pairs of draw rolls may be horizontally level rolls with respect to the glass ribbon. For example, FIG. 7 shows the pull roll device 217 including pairs of draw rolls that may be horizontally level with respect to the glass ribbon wherein the rotation axis extends substantially perpendicular to the draw path 305 of the glass ribbon. Providing one or both of the pairs of rolls of the pull roll device as horizontally level rolls may be desired if cross-wise tension is not necessary across the width of the glass ribbon along the pairs of rolls.

FIGS. 7 and 8 also illustrate another example glass manufacturing apparatus 701 including the pull roll device 217 with a first pull roll apparatus 703 including a first upstream pair of draw rolls 705 including a first pull roll member 707a and a second pull roll member 707b. The first pull roll member 707a can include a first and second refractory roll covering 709a, 709b coupled to a first upper shank 711. Likewise, the second pull roll member 707b can include a first and second refractory roll covering 713a, 713b coupled to a second upper shank 715. The first refractory roll coverings 709a, 713a are configured to engage the first edge portion 205a of the glass ribbon 205 therebetween. Likewise, the second refractory roll coverings 709b, 713b are configured to engage the second edge portion 205b of the glass ribbon 205 therebetween.

At least one of the first and second pull roll members 707a, 707 may be provided with a respective motor 717a, 717b. For example, as shown, both the first and second pull roll members 707a, 707b are provided with a respective motor 717a, 717b. The motor 717a can rotate the first upper shank 711 together with the first and second refractory roll coverings 709a, 709b coupled to the first upper shank 711. Likewise, the motor 717b can rotate the second upper shank 715 together with the first and second refractory roll coverings 713a, 713b coupled to the second upper shank 715. In further examples, only one of the first and second pull roll members 707a, 707b is provided with a motor wherein the other pull roll member may be provided with a bearing such that only one of the first and second pull roll members 707a, 707b is driven.

The pull roll device 217 further includes a second pull roll apparatus 719 including a first downstream pair of draw rolls 721 positioned downstream along the draw path 305 from the first upstream pair of draw rolls 705. The first downstream pair of draw rolls 721 are configured to further draw the first edge portion 205a and the second edge portion 205b of the glass ribbon 205 along the draw path 305. The first downstream pair of draw rolls 721 include a first pull roll member 723a and a second pull roll member 723b. The first pull roll member 723a can include a first and second refractory roll coverings 725a, 725b coupled to a first lower shank 727. Likewise, the second pull roll member 723b can include a first and second refractory roll covering 729a, 729b coupled to a second lower shank 731. The first refractory roll coverings 725a, 729a are configured to engage the first edge portion 205a of the glass ribbon 205 therebetween. Likewise, the second refractory roll coverings 725b, 729b are configured to engage the second edge portion 205b of the glass ribbon 205 therebetween.

At least one of the first and second pull roll members 723a, 723b may be provided with a respective motor 733a, 733b. For example, as shown, both the first and second pull roll members 723a, 723b are provided with a respective motor 733a, 733b. The motor 733a can rotate the first lower shank 727 together with the first and second refractory roll coverings 725a, 725b coupled to the first lower shank 727. Likewise, the motor 733b can rotate the second lower shank 731 together with the first and second refractory roll coverings 729a, 729b coupled to the second lower shank 731. In further examples, only one of the first and second pull roll members 723a, 723b is provided with a motor wherein the other pull roll member may be provided with a bearing such that only one of the first and second pull roll members 723a, 723b is driven.

As shown in FIG. 7, the glass manufacturing apparatus 701 can further include a control device 339 configured to independently operate the first pull roll apparatus 703 and the second pull roll apparatus 719 such that at least one of the first upstream pair of draw rolls 705 rotates with a substantially constant torque and at least one of the first downstream pair of draw rolls 721 rotates with a substantially constant angular velocity. In one example, the control device 339 is configured to operate the first pull roll apparatus 703 such that both of the first upstream pair of draw rolls 705 rotate with a substantially constant torque. In another example, the control device 339 is configured to operate the second pull roll apparatus 719 such that both of the first downstream pair of draw rolls 721 rotate with a substantially constant angular velocity.

As described above, each pull roll apparatus includes at least one motor. The motors can comprise servo motors that may optionally be provided with a gear box to drive the respective rolls. The servo motors, if provided, can provide torque and/or angular velocity measurements back to the control device 339 (e.g., programmable logic controller) that may then be used by the control device 339 to implement the desired control scheme. Alternatively, the control device 339 may interact with other types of motor controllers such as variable frequency drives to control the angular velocity and/or torque of the respective motors. In this example, torque sensors and/or angular velocity sensors may be used to sense operating conditions and provide feedback of the sensed conditions to the control device 339.

Methods of manufacturing the glass ribbon 205 will now be described with respect to the pull roll device 215 illustrated in FIGS. 3-6 with the understanding that a similar, such as an identical methods may be carried out to manufacture the glass ribbon 205 with the pull roll device 217 illustrated in FIGS. 7-8.

Referring to FIG. 3 the method can include the steps of providing the first pull roll apparatus 301 including the first upstream pair of draw rolls 303. In another example, the first pull roll apparatus 301 may optionally be provided with a second upstream pair of draw rolls 313.

The method further includes the step of providing the second pull roll apparatus 321 including the first downstream pair of draw rolls 323 positioned downstream along the draw path 305 from the first upstream pair of draw rolls 303. In a further example, the second pull roll apparatus 321 may optionally be provided with a second downstream pair of draw rolls 303 positioned downstream along the draw path 305 from the second upstream pair of draw rolls 313.

The method further includes the step of forming the glass ribbon 205 with the width "W" extending between the first edge portion 205a and the second edge portion 205b. The first pull roll apparatus 301 can be independently operated, for example, with the control device 339 without input from the second pull roll apparatus 321. For instance, the first pull roll apparatus 301 can be independently operated such that at least one of the first upstream pair of draw rolls 303 rotates with a substantially constant torque to draw the first edge portion 205a of the glass ribbon 205 along the draw path 305. In one example, the first pull roll apparatus 301 can be operated such that both of the first upstream pair of draw rolls 303 rotate with a substantially constant torque.

The second upstream pair of draw rolls 313, if provided, can also be independently operated such that at least one of the second upstream pair of draw rolls 313 rotates with a substantially constant torque to draw the second edge portion 205b of the glass ribbon 205 along the draw path 305. In one example, the first pull roll apparatus 301 can be operated such that both of the second upstream pair of draw rolls 313 rotate with a substantially constant torque. As such, a desired tension 345 along the draw path 305 may be maintained in the glass ribbon 205 between the root 239 and the first pull roll apparatus 301.

The method further independently operates the second pull roll apparatus 321 such that at least one of the first downstream pair of draw rolls 323 rotates with a substantially constant angular velocity to further draw the first edge portion 205a of the glass ribbon 205 along the draw path 305. In one example, the method can include the step of operating the second pull roll apparatus 321 such that both of the first downstream pair of draw rolls 323 rotate with a substantially constant angular velocity.

The second downstream pair of draw rolls 331, if provided, can also be independently operated such that at least one of the second downstream pair of draw rolls 331 rotates with a substantially constant angular velocity to further draw the second edge portion 205b of the glass ribbon 205 along the draw path 305. In one example, the method can include the step of operating the second pull roll apparatus 321 such that both of the second downstream pair of draw rolls 331 rotate with a substantially constant angular velocity. As such, a desired tension 347 along the draw path 305 may be maintained in the glass ribbon 205 between the first pull roll apparatus 301 and the second pull roll apparatus 321.

The method can further include the step of sequentially separating a plurality of glass sheets 247a, 247b from the glass ribbon 205 over a period of time at a location downstream along the draw path 305 from the first downstream pair of draw rolls 303. For example, as shown in FIG. 2, the separating device 219 may be periodically activated to sequentially separate a plurality of glass sheets 247a, 247b as the glass ribbon 205 is drawn from the forming device 203.

FIG. 9 shows an example graph of the forces applied to the glass ribbon by the first upstream pair of draw rolls 303 and the first downstream pair of draw rolls 323. The Y-axis is force (pounds) and the X-axis is time (minutes:seconds). One plot 901 represents the force being applied to the glass ribbon 205 by the first upstream pair of draw rolls 303 while the other plot 903 represents the force being applied to the glass ribbon by the first downstream pair of draw rolls 323. As shown, throughout a period of time, the first upstream pair of draw rolls 303 apply a substantially constant force to the first edge portion 205a of the glass ribbon 205 along the draw path 305 and the first downstream pair of draw rolls 323 apply a varying force to the first edge portion 205a of the glass ribbon 205 along the draw path 305.

Figure 5:
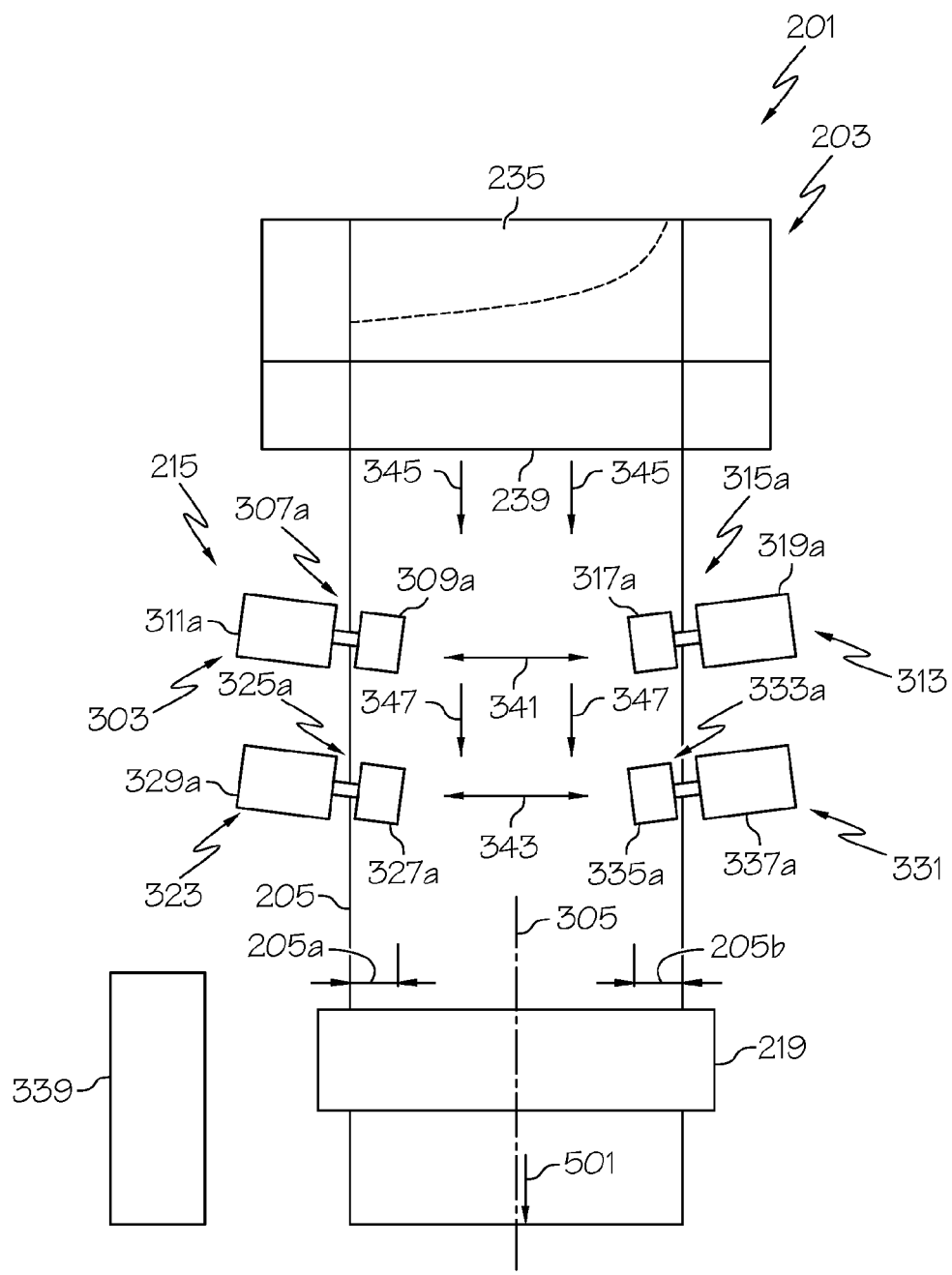
FIG. 5 is a front view of the first example pull roll device illustrated in FIG. 3.
Figure 6:
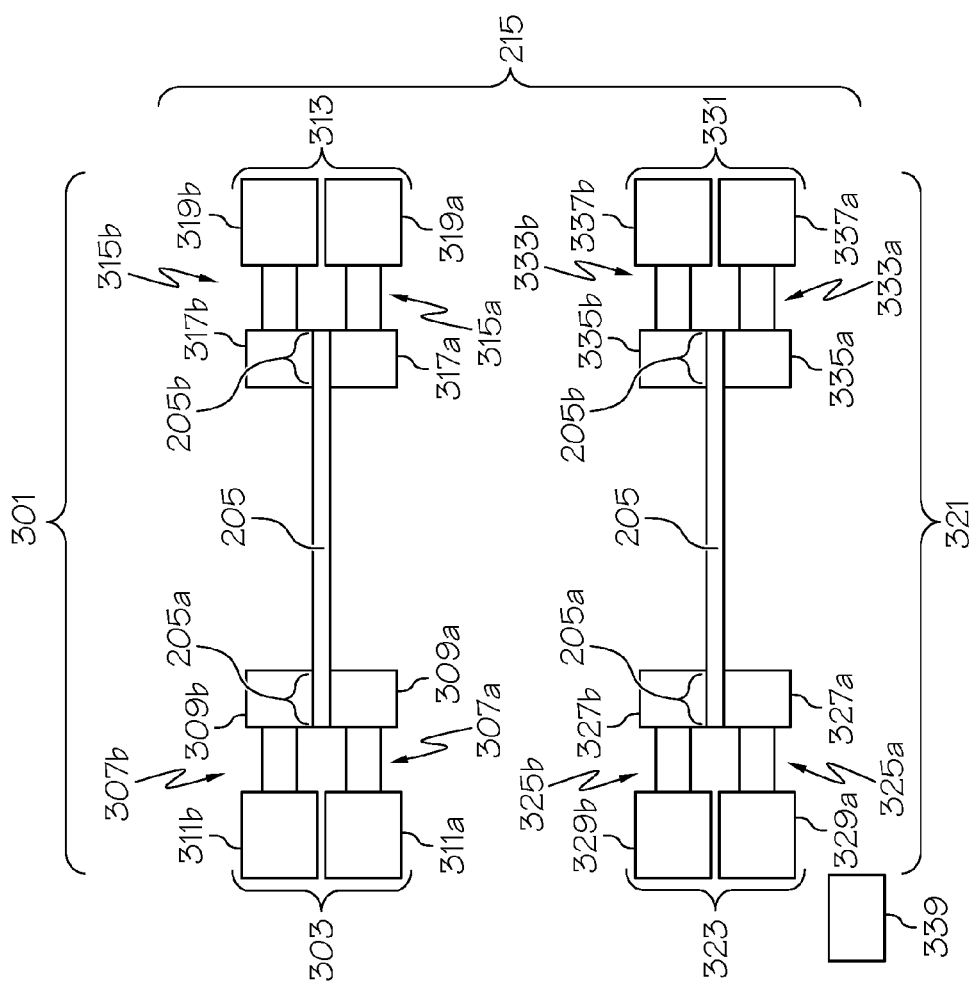
FIG. 6 are top views of the first pull roll apparatus and the second pull roll apparatus of FIGS. 3 and 5.

As shown in FIG. 5, the glass ribbon 205 is drawn in a draw direction 501 along the draw path 305. Turning back to FIG. 9, throughout the period of time, first upstream pair of draw rolls 303 apply a substantially constant force (e.g., 10 pounds) to the first edge portion 205a of the glass ribbon 205 in a direction opposite the draw direction 501. As further illustrated, the first downstream pair of draw rolls 323 apply a varying force (e.g., from about 8 pounds to about 28 pounds) to the first edge portion 205a of the glass ribbon 205 in a direction of the draw direction 501. As such, the first edge portion 205a is constantly maintained in tension between the first upstream pair of draw rolls 303 and the first downstream pair of draw rolls 323 throughout the period of time. In further examples, both forces may act in the positive or negative direction with respect to the draw direction 501 depending on the apparatus set up.

As further shown in FIG. 9, the first downstream pair of draw rolls 323 applies a varying force due to the constant angular velocity associated with the draw rolls 323. The pattern 905 of the plot 903 represents the changing force as the glass ribbon 205 increases in length while the pattern 907 represents the sudden change in force that occurs during separation of a glass sheet from the glass ribbon. During the same period of time, the constant torque of the first upstream pair of draw rolls 303 can maintain a substantially constant force to the glass ribbon. As such, force disturbances can be prevented from being transmitted up the glass ribbon into the setting zone 243 where stress concentrations and corresponding surface defects may be undesirably frozen into the glass ribbon.

As such, methods of the present disclosure can independently operate the first pull roll apparatus 301 over a period of time such that the first upstream pair of draw rolls 303 apply a substantially constant force to the first edge portion 205a of the glass ribbon 205 along the draw path 305. The method can further include the step of independently operating the second pull roll apparatus 321 over the period of time such that at least one of the first downstream pair of draw rolls 323 rotates with a substantially constant angular velocity and the first downstream pair of draw rolls 323 apply a varying force to the first edge portion 205a of the glass ribbon 205 along the draw path 305. The method can further include the step of sequentially separating a plurality of glass sheets 247a from the glass ribbon 205 over the period of time at a location downstream along the draw path 305 from the first downstream pair of draw rolls 303.

As discussed above, the first pull roll apparatus 301 can be provided with a second upstream pair of draw rolls 313. In such examples, the method can further include the step of operating the first pull roll apparatus 301 such that the second upstream pair of draw rolls 313 apply a substantially constant force to the second edge portion 205b of the glass ribbon 205 along the draw path 305. Still further, as mention previously, the second pull roll apparatus 321 can include a second downstream pair of draw rolls 331 positioned downstream along the draw path 305 from the second upstream pair of draw rolls 313. In such examples, the method can further include the step of operating the second pull roll apparatus 321 such that at least one of the second downstream pair of draw rolls 331 rotates with a substantially constant angular velocity and the second downstream pair of draw rolls 303 apply a varying force to the second edge portion 205b of the glass ribbon 205 along the draw path 305.

The pull roll devices 215, 217 can be used to improve the consistency of a cross-draw tension and/or down-draw sheet tension in the glass ribbon which reduces residual stress and improves glass flatness on the manufactured glass ribbon. More specifically, the pull roll devices 215, 217 can be used to control and improve the consistency of the cross-draw tension and/or down-draw sheet tension in the area where the glass ribbon is passing through the setting zone where the product stress and flatness are set in the glass ribbon.

Figure 10:
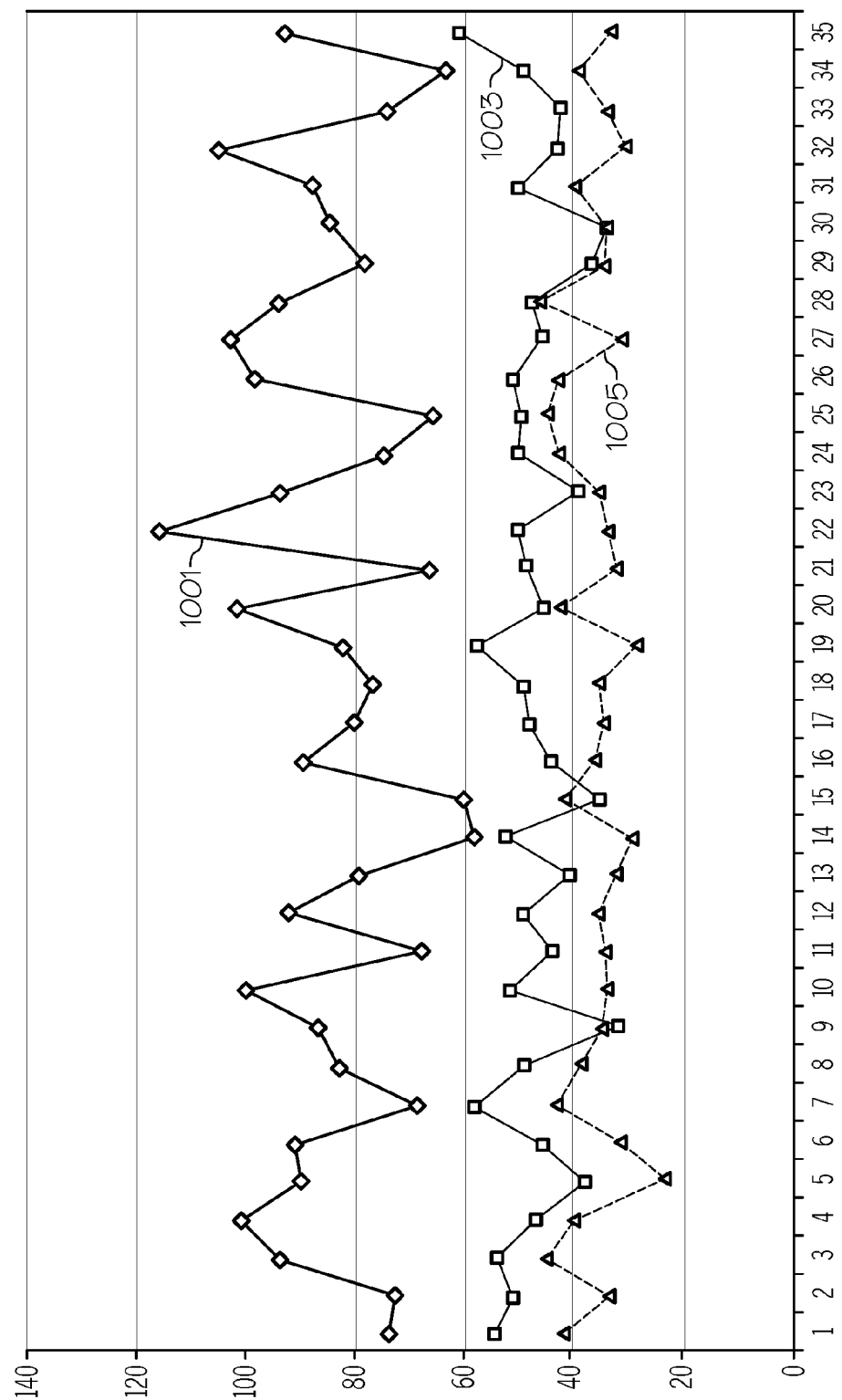
FIG. 10 illustrates a graph of full sheet warp data from sheets made with various control schemes.

FIG. 10 illustrates a graph of full sheet warp data from sheets made with various control schemes. Full sheet warp is a measurement of the deviation of the glass sheet from a plane when the sheet is lying on a flat surface oriented perpendicular to gravity. Maximum deviations from the plane are plotted in FIG. 10 for three sets of sheets made under different conditions. The Y-axis in FIG. 10 represents the maximum deviation in micrometers while the X-axis represents the sheet number. Plot 1001 represents the full sheet warp data of a master/slave configuration wherein the lower pull roll apparatus includes a master motor to rotate lower pair of rolls at a constant angular velocity and the upper pull roll apparatus includes a slave motor configured to rotate an upper pair of rolls at torques that match a predetermined percentage of the measured torque of the master motor of the lower pair of rolls. As shown by plot 1001, the full sheet warp data measures a relatively high maximum deviation in a range of from about 58 microns to about 117 microns.

Plot 1003 in FIG. 10 represents maximum full sheet warp from sheets made using a lower pull roll apparatus and upper pull roll apparatus that are independently operated with a constant angular velocity for both the upper pair of rolls and the lower pair of rolls. As shown by plot 1003, independent constant angular velocity for the upper pair of rolls and the lower pair of rolls results in a reduced maximum deviation in a range of from about 37 microns to about 60 microns.

Plot 1005 in FIG. 10 represents maximum full sheet warp from sheets made using embodiments of the present application where a control device is configured to independently operate the first pull roll apparatus and the second pull roll apparatus such that at least one of the first upstream pair of draw rolls rotates with a substantially constant torque and at least one of the first downstream pair of draw rolls rotates with a substantially constant angular velocity. As shown by plot 1005, such a control configuration surprisingly and significantly reduces the maximum deviation to a range of from about 22 to about 48 microns.

Figure 11:
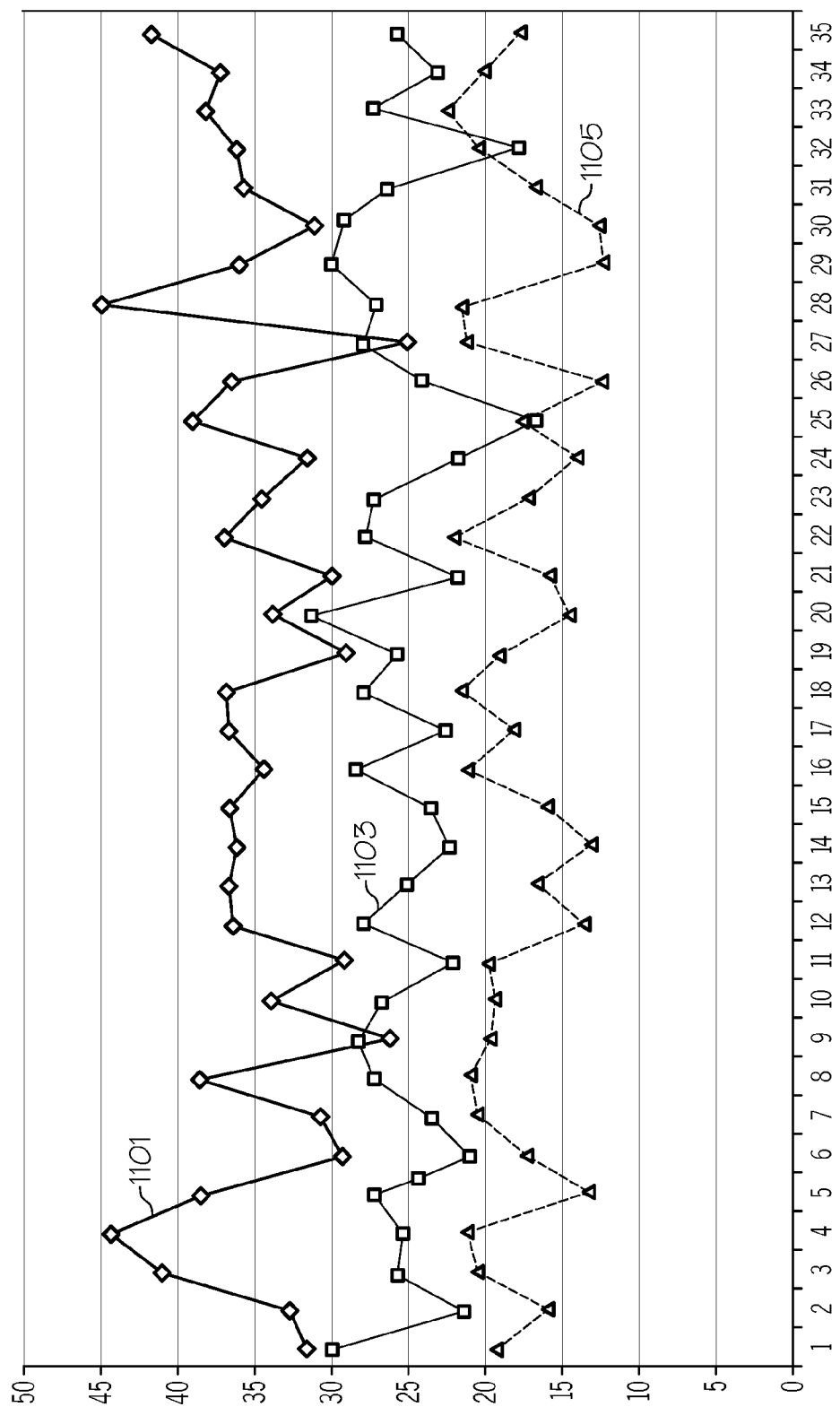
FIG. 11 illustrates another graph of edge gradient data from sheets made with various control schemes.

FIG. 11 illustrates another graph of edge gradient data from sheets made with various control schemes. The edge gradient is calculated from full sheet warp measurements by subtracting the value at a distance 100 mm from the edge from the value at the edge. The difference is a measure of the slope of the glass at the edge of the sheet in the full sheet warp measurement. The Y-axis in FIG. 11 represents the maximum deviation in micrometers/100 mm while the X-axis represents the sheet number. Plot 1101 represents the edge gradient data of a master/slave configuration wherein the lower pull roll apparatus includes a master motor to rotate lower pair of rolls at a constant angular velocity and the upper pull roll apparatus includes a slave motor configured to rotate an upper pair of rolls at torques that match a predetermined percentage of the measured torque of the master motor of the lower pair of rolls. As shown by plot 1101, the edge gradient data measures a relatively high maximum deviation in a range of from about 25 microns/100 mm to about 45 microns/100 mm.

Plot 1103 in FIG. 11 represents the edge gradient data from sheets made using a lower pull roll apparatus and upper pull roll apparatus that are independently operated with a constant angular velocity for both the upper pair of rolls and the lower pair of rolls. As shown by plot 1103, independent constant angular velocity for the upper pair of rolls and the lower pair of rolls results in a reduced maximum edge gradient deviation in a range of from about 17 microns/100 mm to about 30 microns/100 mm.

Plot 1105 in FIG. 11 represents the edge gradient data from sheets made using embodiments of the present application where a control device is configured to independently operate the first pull roll apparatus and the second pull roll apparatus such that at least one of the first upstream pair of draw rolls rotates with a substantially constant torque and at least one of the first downstream pair of draw rolls rotates with a substantially constant angular velocity. As shown by plot 1105, such a control configuration surprisingly and significantly reduces the maximum edge gradient deviation to a range of from about 12 microns/100 mm to about 22 microns/100 mm.

Moreover, providing the operating the upstream pair of draw rolls with a substantially constant torque as set forth by embodiments of the present application and as shown by plots 1005, 1105 provides further advantages over operating the upstream pair of draw rolls with a substantially constant angular velocity (as shown by plots 1003 and 1103). First, a constant angular velocity of the upstream pair of draw rolls may provide different tensions at different diameters in the roll. In contrast, operating the upstream pair of draw rolls at a substantially constant torque allows consistent vertical tension to be achieved over time. Indeed, operating with a substantially constant torque nearly compensates for wear of the roll. Forces change slightly with roll diameter as the roll wears at constant torque, but the effect is very small. Velocity control has a much higher sensitivity to roll diameter. Second, a constant angular velocity of the upstream pair of draw rolls may prove difficult to correlate with the sheet speed due to the diameter uncertainty of the roll. In contrast, operating the upstream pair of draw rolls with a substantially constant torque removes the need to correlate to obtain the proper angular velocity of the roller. Third, operating the upstream pair of draw rolls with a substantially constant torque can avoid the risk of buckling or crack out that may occur when trying to adjust the speed of the upstream pair of draw rolls to compensate for roll wear. Fourth, operating the upstream pair of draw rolls with a substantially constant torque can avoid the risk of the rolls skipping if the constant angular velocity is too slow. Fifth, operating the upstream pair of draw rolls can avoid excess pull force variability that may occur due to roll run-out in a constant angular velocity.

It will be apparent to those skilled in the art that various modifications and variations can be made without departing from the spirit and scope of the claimed invention.

What is claimed is:

1. A method of manufacturing a glass ribbon comprising the steps of:
   (I) providing a first pull roll apparatus including a first upstream pair of draw rolls and a second pull roll apparatus including a first downstream pair of draw rolls positioned downstream along a draw path from the first upstream pair of draw rolls;
   (II) forming a glass ribbon with a width extending between a first edge portion and a second edge portion;
   (III) independently operating the first pull roll apparatus such that at least one of the first upstream pair of draw rolls rotates with a substantially constant torque to draw the first edge portion of the glass ribbon along the draw path; and
   (IV) independently operating the second pull roll apparatus such that at least one of the first downstream pair of draw rolls rotates with a substantially constant angular velocity to further draw the first edge portion of the glass ribbon along the draw path.

2. The method of claim 1, wherein step (III) includes operating the first pull roll apparatus such that both of the first upstream pair of draw rolls rotate with a substantially constant torque.

3. The method of claim 1, wherein step (III) includes operating the second pull roll apparatus such that both of the first downstream pair of draw rolls rotate with a substantially constant angular velocity.

4. The method of claim 1, wherein step (I) further provides the first pull roll apparatus with a second upstream pair of draw rolls and wherein step (III) operates the first pull roll apparatus such that at least one of the second upstream pair of draw rolls rotates with a substantially constant torque to draw the second edge portion of the glass ribbon along the draw path.

5. The method of claim 4, wherein step (III) further operates the first pull roll apparatus such that both of the second upstream pair of draw rolls rotate with a substantially constant torque.

6. The method of claim 4, wherein step (I) further provides the second pull roll apparatus with a second downstream pair of draw rolls positioned downstream along the draw path from the second upstream pair of draw rolls and wherein step (III) further operates the second pull roll apparatus such that at least one of the second downstream pair of draw rolls rotates with a substantially constant angular velocity to further draw the second edge portion of the glass ribbon along the draw path.

7. The method of claim 6, wherein the step (III) further operates the second pull roll apparatus such that both of the second downstream pair of draw rolls rotate with a substantially constant angular velocity.

8. The method of claim 1, further comprising a step (V) of sequentially separating a plurality of glass sheets from the glass ribbon over a period of time at a location downstream along the draw path from the first downstream pair of draw rolls, wherein, throughout the period of time, the first upstream pair of draw rolls apply a substantially constant force to the first edge portion of the glass ribbon along the draw path and the first downstream pair of draw rolls apply a varying force to the first edge portion of the glass ribbon along the draw path.

9. The method of claim 8, wherein the glass ribbon is drawn in a draw direction along the draw path, and wherein, throughout the period of time, first upstream pair of draw rolls apply a substantially constant force to the first edge portion of the glass ribbon in a direction opposite the draw direction, and the first downstream pair of draw rolls apply a varying force to the first edge portion of the glass ribbon in a direction of the draw direction, wherein the first edge portion is constantly maintained in tension between the first upstream pair of draw rolls and the first downstream pair of draw rolls throughout the period of time.

10. A method of manufacturing a glass ribbon comprising the steps of:
    (I) providing a first pull roll apparatus including a first upstream pair of draw rolls and a second pull roll apparatus including a first downstream pair of draw rolls positioned downstream along a draw path from the first upstream pair of draw rolls;
    (II) forming a glass ribbon with a width extending transverse to the draw path between a first edge portion and a second edge portion;
    (III) independently operating the first pull roll apparatus over a period of time such that the first upstream pair of draw rolls apply a substantially constant force to the first edge portion of the glass ribbon along the draw path;
    (IV) independently operating the second pull roll apparatus over the period of time such that at least one of the first downstream pair of draw rolls rotates with a substantially constant angular velocity and the first downstream pair of draw rolls apply a varying force to the first edge portion of the glass ribbon along the draw path; and
    (V) sequentially separating a plurality of glass sheets from the glass ribbon over the period of time at a location downstream along the draw path from the first downstream pair of draw rolls.

11. The method of claim 10, wherein the glass ribbon is drawn in a draw direction along the draw path, and wherein, throughout the period of time, first upstream pair of draw rolls apply the substantially constant force to the first edge portion of the glass ribbon in a direction opposite the draw direction, and the first downstream pair of draw rolls apply the varying force to the first edge portion of the glass ribbon in a direction of the draw direction, wherein the first edge portion is maintained in tension between the first upstream pair of draw rolls and the first downstream pair of draw rolls throughout the period of time.

12. The method of claim 10, wherein step (I) further provides the first pull roll apparatus with a second upstream pair of draw rolls and wherein step (III) operates the first pull roll apparatus such that the second upstream pair of draw rolls apply a substantially constant force to the second edge portion of the glass ribbon along the draw path.

13. The method of claim 12, wherein step (I) further provides the second pull roll apparatus with a second downstream pair of draw rolls positioned downstream along the draw path from the second upstream pair of draw rolls and wherein step (III) further operates the second pull roll apparatus such that at least one of the second downstream pair of draw rolls rotates with a substantially constant angular velocity and the second downstream pair of draw rolls apply a varying force to the second edge portion of the glass ribbon along the draw path.

\* \* \* \* \*